United States Patent
Uchida

(10) Patent No.: US 7,813,230 B2
(45) Date of Patent: Oct. 12, 2010

(54) OPTICAL RECORDING MEDIUM DRIVING APPARATUS AND OPTICAL RECORDING MEDIUM DRIVING METHOD

(75) Inventor: Masaki Uchida, Tokyo (JP)

(73) Assignee: Sony Corporation, Tokyo (JP)

( * ) Notice: Subject to any disclaimer, the term of this patent is extended or adjusted under 35 U.S.C. 154(b) by 481 days.

(21) Appl. No.: 11/983,072

(22) Filed: Nov. 7, 2007

(65) Prior Publication Data
US 2008/0130452 A1 Jun. 5, 2008

(30) Foreign Application Priority Data
Nov. 8, 2006 (JP) .............................. 2006-303135

(51) Int. Cl.
*G11B 7/00* (2006.01)
(52) U.S. Cl. ................................. 369/44.25; 369/53.23
(58) Field of Classification Search ............. 369/44.25, 369/44.27, 44.29, 94, 53.2, 53.23
See application file for complete search history.

(56) References Cited

U.S. PATENT DOCUMENTS

| 5,477,514 | A | * | 12/1995 | Watanabe et al. | ........ 369/44.28 |
| 5,790,493 | A | * | 8/1998 | Takeya et al. | ............ 369/53.23 |
| 5,859,824 | A | * | 1/1999 | Izumi et al. | ............... 369/44.29 |
| 6,246,646 | B1 | * | 6/2001 | Abe et al. | ................. 369/44.27 |
| 6,327,234 | B1 | * | 12/2001 | Kamiyama et al. | ........ 369/53.23 |
| 6,744,705 | B1 | * | 6/2004 | Sumida et al. | ........... 369/44.11 |
| 2006/0120229 | A1 | * | 6/2006 | Nabeta | ..................... 369/44.27 |
| 2006/0203628 | A1 | * | 9/2006 | Komma et al. | ........... 369/44.25 |
| 2007/0030772 | A1 | * | 2/2007 | Matsui | ..................... 369/44.29 |

* cited by examiner

*Primary Examiner*—Thang V Tran
(74) *Attorney, Agent, or Firm*—Wolf, Greenfield & Sacks, P.C.

(57) ABSTRACT

When a type of an optical disc is discriminated by disc type discriminating processing, search operation by a CD light beam is carried out in CD discriminating processing, and a distance from a position xf where a large signal change of a first time is detected as a fake phenomenon to a position xs where the large signal change of a second time corresponding to a recording layer is detected as a moving distance d3. Based on the moving distance d3, whether the optical disc is a CD medium is determined. In this manner, whether the optical disc is the CD medium or not can be determined correctly with high precision.

9 Claims, 12 Drawing Sheets

OPTICAL RECORDING MEDIUM DRIVING APPARATUS AND OPTICAL RECORDING MEDIUM DRIVING METHOD

CROSS REFERENCES TO RELATED APPLICATIONS

The present invention contains subject matter related to Japanese Patent Application JP 2006-303135 filed in the Japanese Patent Office on Nov. 8, 2006, the entire contents of which being incorporated herein by reference.

BACKGROUND OF THE INVENTION

1. Field of the Invention

The present invention relates to an optical recording medium driving apparatus and an optical recording medium driving method, and is suitably applied, for example, to an optical disc driving apparatus.

2. Description of the Related Art

As an optical disc driving apparatus, one that is configured to irradiate a light beam to an optical disc as a recording medium and thereby recording information to the optical disc or reproducing information from the optical disc has been widely used.

Among the optical disc driving apparatuses, one that is compatible with both an optical disc of a compact disc (CD) system in which a light beam of a wavelength of around 780 nm is used, and an optical disc of a digital versatile disc (DVD) system in which an light beam of a wavelength of around 660 nm is used has been suggested.

Further, optical discs commonly have a disc shape with an external diameter of around 120 mm and a thickness of around 1.2 mm in both the CD system and the DVD system. However, a space from a front surface of the optical disc to a recording layer thereof where information is recorded, that is, a thickness of a so-called cover layer, is different in both systems, and is around 1.2 mm in the CD system and around 0.6 mm in the DVD system.

Moreover, with respect to the optical driving apparatus as well, a numerical aperture (NA) of an objective lens that irradiates an light beam to the optical disc is specified, and a numerical aperture for the optical disc of the CD system needs to be 0.45 and a numerical aperture for the optical disc of the DVD system needs to be 0.6.

Under the circumstances, among the optical disc driving apparatuses, one that is compatible with the optical discs of both the CD system and the DVD system by using a bifocal objective lens having two focuses has been suggested.

Such an optical disc driving apparatus uses a method of recognizing a space between a front surface of the optical disc and a recording layer thereof based on, for example, a result of detection of a reflected light beam obtained by irradiation of a light beam on the optical disc, when the optical disc is loaded, in order to determine a type of the optical disc from the CD system or the DVD system based on the space, and of properly focusing the light beam on the recording layer. At this time, the optical disc driving apparatus can exclude a reflected light beam component that is obtained by a false focus which is not a desired focus among focuses of the light beam (for example, refer to Jpn. Pat. Appln. Laid-Open Publication No. 2003-157545 [FIG. 2]).

SUMMARY OF THE INVENTION

In recent years, a Blu-ray disc (registered trademark, hereinafter referred to as "BD") system using an light beam with a wavelength of around 405 nm has been suggested in accordance with a demand for higher capacity and so on of an optical disc. In this BD system, a numerical aperture of an objective lens is specified to be 0.85.

In view of the above, the optical disc driving apparatus is considered to have a trifocal objective lens as the objective lens so as to be compatible with an optical disc of the BD system in addition to those of the CD system and the DVD system.

However, in a case of using such an objective lens, a plurality of focuses are generated in the optical disc driving apparatus, and due to a problem on optical design, there is a possibility that a reflected light beam of a sufficient amount of light is detected even when a false focus of an light beam focuses on a recording layer. In addition, since a plurality of focuses are generated, there is also a possibility that a reflected light beam of a sufficient amount of light is detected when a focus of an light beam focuses on a layer other than the desired recording layer, for example, on a surface of an optical disc.

In such a case, it is difficult for the optical disc driving apparatus to discriminate between a reflected light beam obtained by the desired focus and a reflected light beam obtained from the false focus. Thus, it is not possible to correctly recognize the recording layer. As a result, there has been a problem that it is not possible to a type of the optical disc and also it is not possible to properly focus a light beam on the recording layer.

In consideration of the above circumstances, it is desirable to provide an optical recording medium driving apparatus and an optical recording medium driving method in which the recording layer of an optical recording medium can be recognized correctly.

According to an embodiment of the present invention, there is provided an optical recording medium driving apparatus, including: an objective lens that focuses an light beam on an optical recording medium provided with a recording layer for information recording, and is moved along an optical axis of the light beam by a predetermined driving unit; a detection unit that detects a reflected light beam obtained by a reflection of the light beam from the optical recording medium and generates a detection signal; and a control unit that, when the driving unit is controlled to make the objective lens moved close to the optical recording medium from a distant position, sets a position of a focus of the objective lens when the detection signal at a level similar to a focus level obtained when the light beam is focused on the recording layer as a reference point, and also recognizes that the light beam is focused on the recording layer when the detection signal of the focus level is obtained for the number of times designated in advance.

A position of the focus of the light beam not on the recording layer when a detection signal at a level similar to a focus level is obtained is set as a reference point. In this manner, possibility of detecting in error that the light beam is focused on the recording layer although the focus of the light beam is not on the recording layer can be reduced.

In addition, according to an embodiment of the present invention, there is provided an optical recording medium driving method, including: a step of moving an objective lens that focuses an light beam on an optical recording medium provided with a recording layer for information recording close to the optical recording medium along an optical axis of the light beam from a distant position; a step of detecting a reflected light beam obtained by a reflection of the light beam from the optical recording medium and generating a detection signal; a step of setting a position of a focus of the objective lens when the detection signal at a level similar to a focus level obtained when the light beam is focused on the recording layer is obtained as a reference point; and a step of recognizing that the light beam is focused on the recording layer when the detection signal of the focus level is obtained for the number of times designated in advance.

A position of the focus of the light beam not on the recording layer when a detection signal at a level similar to a focus level is obtained is set as a reference point. In this manner, possibility of detecting in error that the light beam is focused on the recording layer although the focus of the light beam is not on the recording layer can be reduced.

According to the present invention, a position of the focus of the light beam not on the recording layer when a detection signal at a level similar to a focus level is obtained is set as a reference point. In this manner, possibility of detecting in error that the light beam is focused on the recording layer although the focus of the light beam is not on the recording layer can be reduced. Thus, the optical recording medium driving apparatus and the optical recording medium driving method capable of recognizing the recording layer of the optical recording medium correctly with high precision can be achieved.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Hereinafter, an embodiment of the present invention will be described in detail with reference to the accompanying drawings.

(1) Configuration of Optical Disc Driving Apparatus

Figure 1:
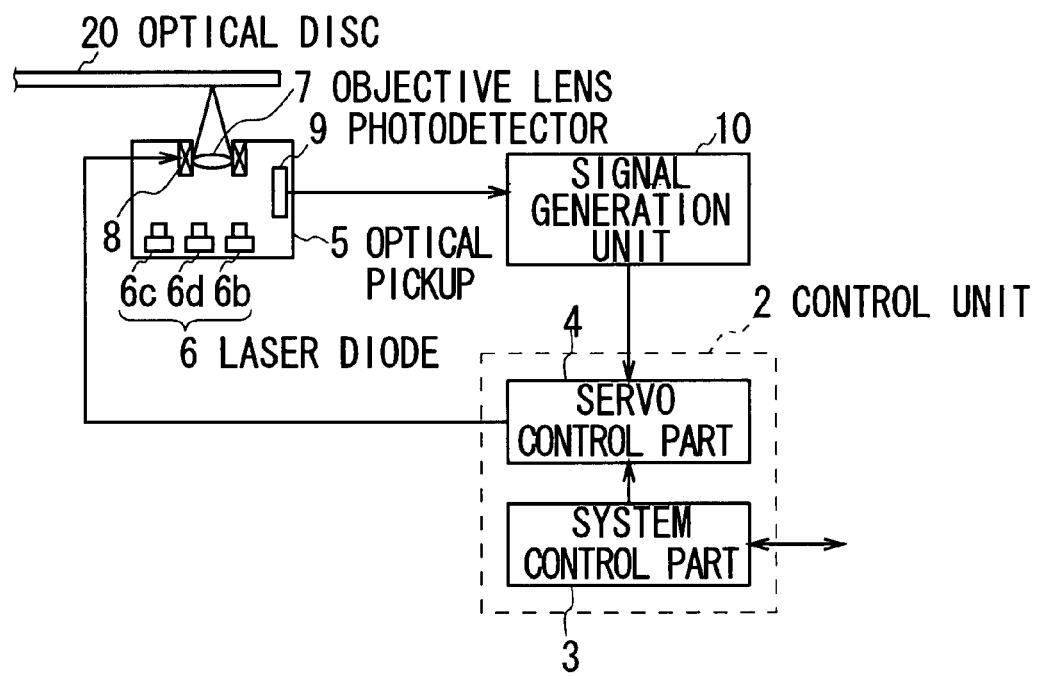
FIG. 1 is a schematic diagram showing a configuration of an optical disc driving apparatus.

In FIG. 1, an optical disc driving apparatus 1, based on an instruction from external equipment (not shown), records information on an optical disc 20 as an optical recording medium and reproduces information recorded in the optical disc 20.

In addition, the optical disc driving apparatus 1 is made compatible with the optical disc 20 in any of three systems, which are a Compact Disc (CD) system, a Digital Versatile Disc (DVD) system, and a Blu-ray Disc (BD) (registered trademark) system. For convenience hereinafter, the optical disc 20 in these systems will be referred to as a CD medium 20c, a DVD medium 20d, and a BD medium 20b, respectively.

The CD medium 20c, the DVD medium 20d, and the BD medium 20b are common in a point that these media have a disc shape with an external diameter of around 120 mm and a thickness of around 1.2 mm. However, these media are different among each other with respect to a wavelength of an light beam used at the times of recording and reproducing of information, a numerical aperture of an objective lens where the light beam is focused, and a space from a front surface on which the light beam is irradiated to a recording layer that records information (a thickness of a so-called cover layer).

To be more specific, in the CD system, the DVD system, and the BD system, it is specified that the wavelengths of the light beams are around 780 nm, around 660 nm, and around 405 nm, respectively, and the numerical apertures of the objective lenses are around 0.45, around 0.6, and around 0.85, respectively, and the thicknesses of the cover layers (hereinafter referred to as "layer thickness TL") is around 1.2 mm, around 0.6 mm, and around 0.1 mm, respectively.

On the other hand, the entire optical disc driving apparatus 1 is controlled by a system control part 3 of a control unit 2 in an integrated manner. This system control part 3 is configured mainly with a Central Processing Unit (CPU) (not shown), and executes a variety of types of processing such as disc type discrimination processing and focus control starting processing by reading out a variety of programs such as a basic program, a disc type discrimination program, and a focus control starting program from a read only memory (ROM) (not shown), and expanding the programs in a random access memory (RAM) (not shown).

For example, when the optical disc driving apparatus 1 receives an instruction for reproduction from external equipment (not shown) in a state where the optical disc 20 is mounted, the apparatus 1 reads out information recorded in the optical disc 20.

In practice, a servo control part 4 rotates the optical disc 20 by controlling drive of a spindle motor (not shown) based on an instruction from the system control part 3, and also irradiates an light beam to the optical disc 20 from an optical pickup 5.

The optical pickup 5 is a so-called three-wavelength compatible type, and has a CD laser diode 6c that emits a CD light beam having a wavelength of around 780 nm, a DVD laser diode 6d that emits a DVD light beam having a wavelength of around 660 nm, and a BD laser diode 6b that emits a BD light beam having a wavelength of around 405 nm (these are hereinafter collectively referred to as the "laser diodes 6").

The optical pickup 5 emits an light beam from any of the laser diodes 6 corresponding to a type (that is, any of the CD medium 20c, the DVD medium 20d, and the BD medium 20b) of the optical disc 20. For example, if the optical disc 20 is the BD medium 20b, the optical pickup 5 emits the BD light beam from the BD laser diode 6b. Thereafter, the optical pickup 5 focuses the light beam by an objective lens 7 via an optical member (not shown).

The objective lens 7 is driven by an actuator 8 in a direction being closer to or separated from the optical disc 20 along an optical axis of an light beam, that is, a focus direction. In this way, the objective lens 7 is made following the optical disc 20 when so-called surface shake occurs on the optical disc 20 being rotated.

In addition, the objective lens 7 is configured with a combination of a plurality of optical members (not shown), and forms a plurality of focuses at the same time. For this reason, the objective lens 7 has a plurality of numerical apertures when an light beam enters.

In practice, the objective lens 7 can focus the CD light beam with a numerical aperture of around 0.45, the DVD light beam with a numerical aperture of around 0.6, and the BD light beam with a numerical aperture of around 0.85. On the other hand, the objective lens 7 focuses an light beam with other numerical apertures at the same time.

When a reflected light beam obtained by a reflection of a light beam from the optical disc 20 enters the objective lens 7, the optical pickup 5 irradiates the reflected light beam on a photodetector 9 via an optical member (not shown).

The photodetector 9 has a plurality of detection regions on a surface on which the reflected light beam is irradiated, generates a plurality of light receiving signals by carrying out photoelectric conversion for each of the detection regions, and supplies the light receiving signals to a signal generation unit 10.

The signal generation unit 10 generates a pull-in signal SPI showing a light amount of the reflected light beam, a focus error signal SFE showing a shift amount between a focus of an light beam and a recording layer of the optical disc 20, a reproducing RF signal SRF showing information recorded in the optical disc 20, and so on by carrying out predetermined calculation processing based on the light receiving signals, and supplies these signals to the control unit 2.

The servo control part 4 of the control unit 2 supplies a focus driving signal SDF that makes the focus error signal SFE close to a value "0" to the actuator 8 based on the focus error signal SFE, and thereby the servo control part 4 moves the objective lens 7 in the focus direction so as to make the focus of the light beam moving closer to the recording layer of the optical disc 20.

That is, the servo control part 4 feedback-controls the objective lens 7 in the focus direction via the actuator 8, and thereby making the focus of the light beam following the recording layer of the optical disc 20.

Further, the control unit 2 reproduces the information recorded in the optical disc 20 and sends out the information to external equipment (not shown) by applying predetermined demodulation processing, decoding processing, and so on to the reproducing RF signal SRF by a signal processing unit (not shown).

In addition, the optical disc driving apparatus 1 records information to the optical disc 20, for example, when the apparatus 1 receives an instruction for recording, data to be recorded, and so on from external equipment (not shown) in state where the optical disc 20 is mounted.

In this case as well, the servo control part 4 feedback-controls the objective lens 7 via the actuator 8, and thereby making the focus of the light beam following the recording layer of the optical disc 20, as similar to the case of reproducing information from the optical disc 20.

As described above, the optical disc driving apparatus 1 irradiates an light beam to the optical disc 20, and carries out so-called focus control in which the objective lens 7 is feedback-controlled in the focus direction based on a result of detecting the reflected light beam, and thereby making the focus of the light beam following the recording layer of the optical disc 20.

(2) Discrimination of Disc Type of Optical Disc

As described above, a wavelength of an light beam to be irradiated at the times of recording and reproducing and a thickness of the cover layer are different between each types of the optical disc 20.

For this reason, the optical disc driving apparatus 1 needs to switch the wavelengths of the light beam, that is, from which of the CD laser diode 6c, the DVD laser diode 6d, or the BD laser diode 6b the light beam should be emitted, and positions where the light beam is focused with respect to the focus direction, that is, positions of the objective lens 7 with respect to the focus direction, according to a type of the optical disc 20.

In view of the above, the optical disc driving apparatus 1 discriminates the types of the optical disc 20 when the optical disc 20 is newly mounted.

To be more specific, the optical disc driving apparatus 1 first irradiates the BD light beam to the optical disc 20, and determines whether the optical disc 20 is the BD medium 20b or not. Here, in a case where the optical disc 20 is not the BD medium 20b, the optical disc driving apparatus 1 next irradiates the DVD light beam to the optical disc 20, and determines whether the optical disc 20 is the DVD medium 20d or not.

Further, in a case where the optical disc 20 is not the DVD medium 20d, although there is high possibility that the optical disc 20 is the CD medium 20c, the optical disc driving apparatus 1 irradiates the CD light beam to the optical disc 20 for confirmation, and determines whether the optical disc 20 is the CD medium 20d or not.

In this manner, the optical disc driving apparatus 1 carries out disc type discriminating processing for discriminating a type of the optical disc 20 by sequentially determining whether the optical disc 20 is the BD medium 20b or not, whether the disc 20 is the DVD medium 20d or not, and whether the disc 20 is the CD medium 20d or not.

(2-1) BD Discriminating Processing and DVD Discriminating Processing

Description will be made with respect to, first, a case where the optical disc driving apparatus 1 carries out the BD discriminating processing for determining whether the optical disc 20 is the BD medium, and then a case where the apparatus 1 carries out the DVD discriminating processing for determining whether the optical disc 20 is the DVD medium with the BD discriminating processing taken as an example.

The system control part 3 of the optical disc driving apparatus 1 focuses the BD light beam from the objective lens 7 so that the numerical aperture becomes around 0.85 by irradiating the BD light beam from the BD laser diode 6b.

In addition, the system control part 3 controls drive of the actuator 8 via the servo control part 4, and thereby the control part 3 makes the objective lens 7 in a state of being located distant from the optical disc 20 moving closer to the optical disc 20 in constant speed V. Further, the system control part 3 monitors a change of the focus error signal SFE and the pull-in signal SPI (a series of operations will be hereinafter referred to as the "search operation by the BD light beam").

Figure 2:
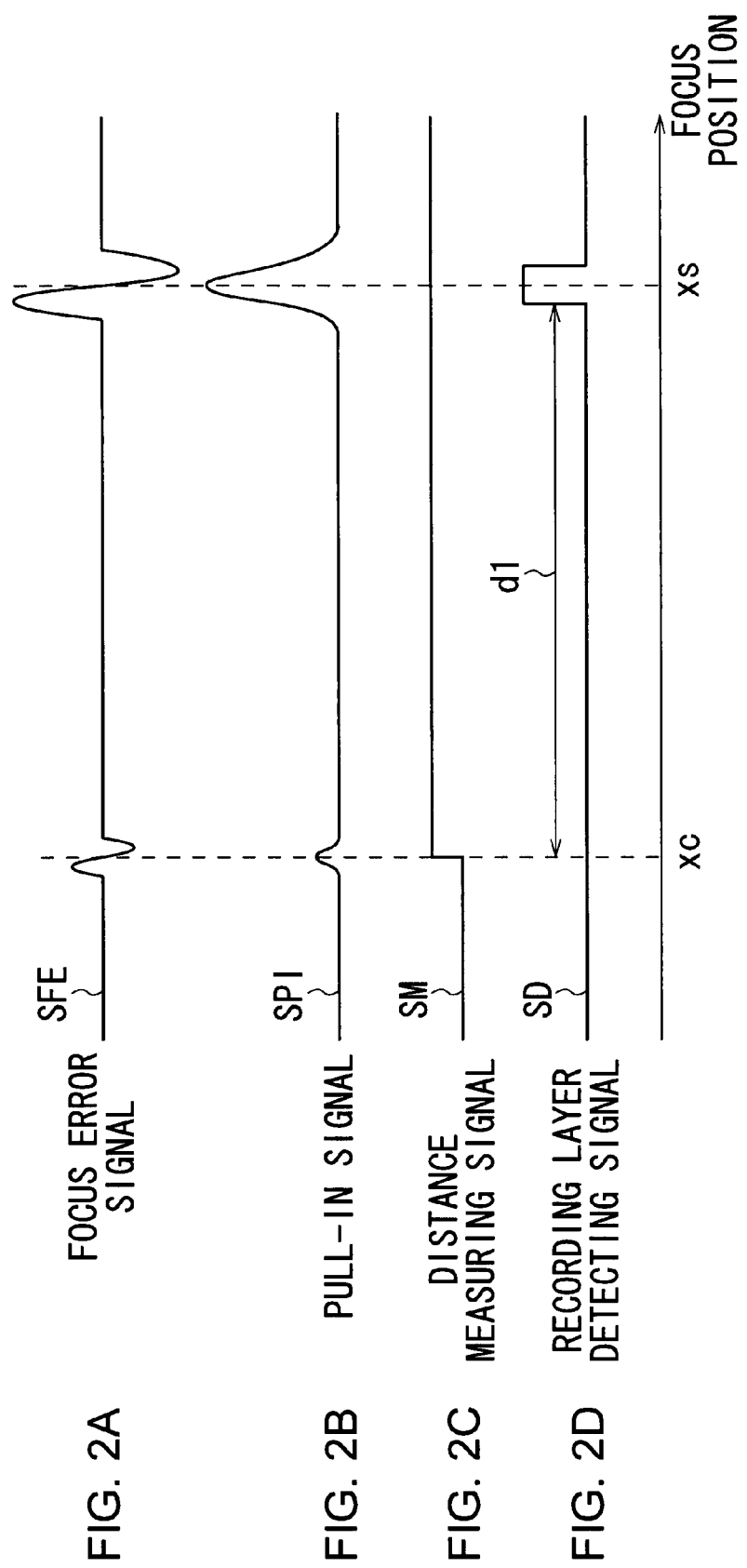
FIG. 2 is a schematic diagram used for explaining distance measurement in BD discriminating processing and DVD discriminating processing.

When the focus error signal SFE changes so as to make an S-shaped curve of comparatively small size, and the pull-in signal SPI temporarily increases at the same time as shown in FIG. 2 (hereinafter this change will be referred to as the "small signal change"), the system control part 3 recognizes that the BD light beam is focused on a front surface of the optical disc 20.

At this time, the system control part 3 assumes that the focus of the light beam is at a reference point, and increases a distance measuring signal SM for measuring a moving distance of the focus, that is, a moving distance of the objective lens 7 from a low level to a high level, and starts measuring of time by a counter (not shown).

When the focus error signal SFE changes so as to make an S-shaped curve of comparatively large size, and the pull-in signal SPI temporarily largely increases at the same time (hereinafter this change will be referred to as the "large signal change"), the system control part 3 recognizes that the BD light beam is focused on the recording layer of the optical disc 20, and increases a recording layer detection signal SD showing that the recording layer is detected from a low level to a high level temporarily.

At this time, the system control part 3 terminates the measuring of time by the counter when the recording layer detection signal is increased to a high level, and calculates a moving distance d1 during the measuring by the counter, that is, a distance from a position xc to a position xs, by multiplying elapsed time TP by the moving speed V of the objective lens 7.

Next, the system control part 3 compares the moving distance d1 with the layer thickness TL=0.1 mm of the BD medium 20b. To be more specific, the system control part 3 determines that the optical disc 20 is the BD medium 20b, for example, if the moving distance d1 is within a range of 0.1±0.02 mm (this range is hereinafter referred to as the "permissible range") by taking into consideration an individual difference of the optical disc 20, a measuring error, and so on.

On the other hand, in a case where the moving distance d1 here is not within the permissible range of the BD medium 20b, the system control part 3 determines that the optical disc 20 is not the BD medium 20b, but is any one of the DVD medium 20d and the CD medium 20c.

As described above, in the BD discriminating processing, the system control part 3 carries out the search operation by the BD light beam, measures a space from the front surface of the optical disc 20 to the recording layer thereof as the moving distance d1 based on the small signal change and the large signal change in the focus error signal SFE and the pull-in signal SPI, and compares the moving distance d1 with the layer thickness TL of the BD medium 20b, and thereby the system control part 3 determines whether the optical disc 20 is the BD medium 20b or not.

In the DVD discriminating processing as well, the system control part 3 determines whether the optical disc 20 is the DVD medium 20d or not by a similar method as the BD discriminating processing.

(2-2) CD Discriminating Processing

Next, CD discriminating processing in which the optical disc driving apparatus 1 determines whether the optical disc 20 is the CD medium 20c or not will be described.

The system control part 3 of the optical disc driving apparatus 1 emits the CD light beam from the CD laser diode 6c, and thereby focusing the CD light beam from the objective lens 7 so as to obtain a numerical aperture of around 0.45.

Here, a relationship between changes in the focus error signal SFE and the pull-in signal SPI and a position of a focus of the CD light beam in a case where search operation by the CD light beam with respect to the CD medium 20c is carried out in the optical disc driving apparatus 1 was tested.

The focus here means a focus when the numerical aperture is around 0.45 among a plurality of focuses formed by the objective lens 7.

Figure 3:
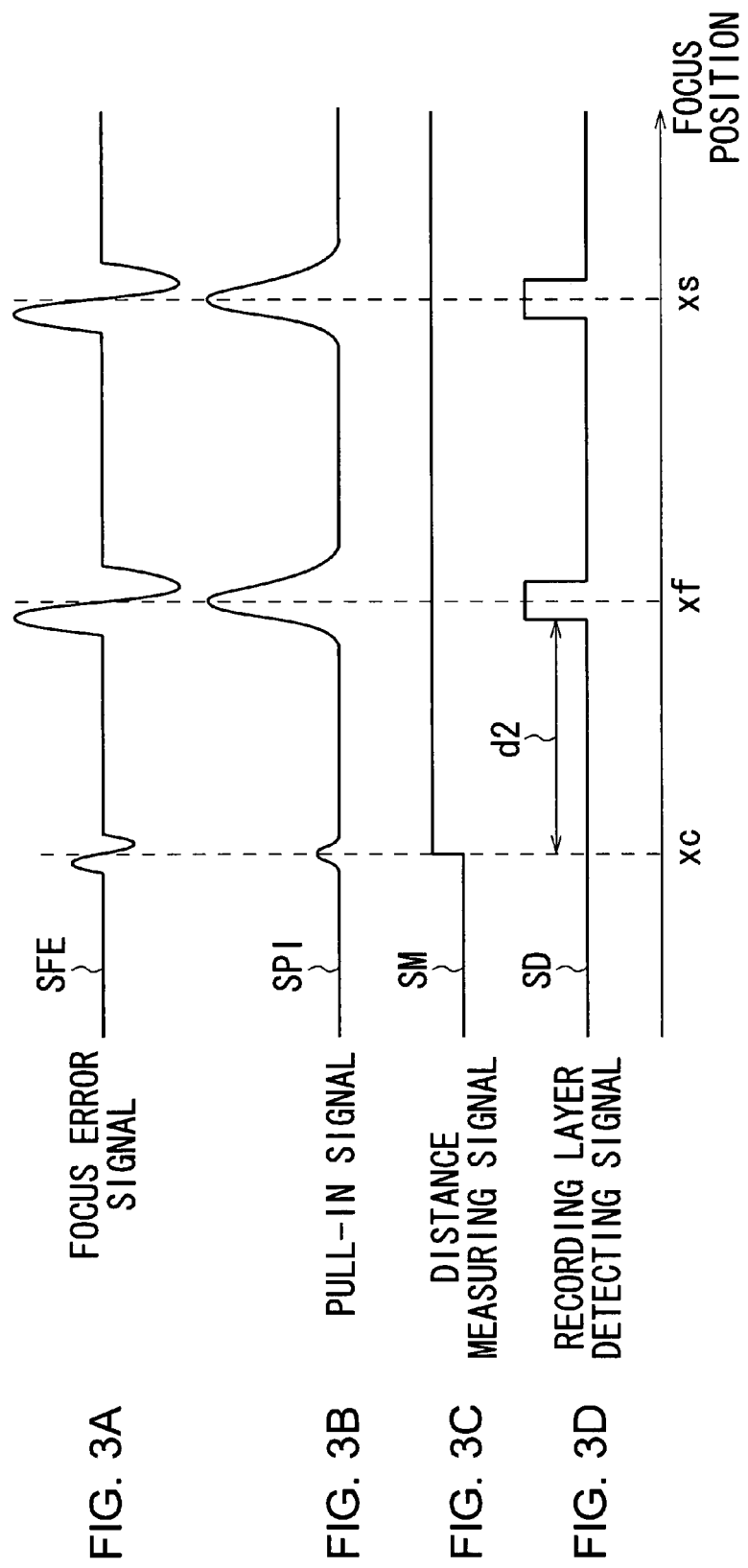
FIG. 3 is a schematic diagram used for explaining distance measurement in CD discriminating processing (1)

In this case, as shown in FIG. 3 corresponding to FIG. 2, the system control part 3 first detects the small signal change in which the focus error signal SFE changes so as to make a comparatively small S-shaped curve and the pull-in signal SPI temporarily increases at the same time as similar to the case in the BD discriminating processing, when the CD light beam is focused on the front surface of the optical disc 20.

Thereafter, when the search operation is continued and the objective lens 7 is moved close to the optical disc 20, the system control section 3 detects the large signal change as similar to the case of the BD discriminating processing.

However, at that point in time, the focus of the CD light beam was only moved to the vicinity of a middle point between the front surface and the recording layer of the optical disc 20. That is, the CD light beam was focused at a position not reaching the recording layer of the optical disc 20, and was not focused on the recording layer.

This is assumed to have happened because the focus error signal SFE changes so as to make a comparatively large S-shaped curve and, at the same time, the pull-in signal SPI temporarily increases largely, since the objective lens 7 has a plurality of focuses and a focus which is different from a focus with the numerical aperture of around 0.45 among the plurality of focuses is focused on the front surface, the recording layer, or the like of the optical disc 20.

Hereinafter, for convenience in description, generation of the large signal change by the system control part 3 in a state where the CD light beam is not focused on the recording layer of the optical disc 20 will be referred to as a fake phenomenon.

In the cases of the BD discriminating processing and the DVD discriminating processing, the optical disc driving apparatus 1 do not detect the fake phenomenon described above. It is assumed that, when the objective lens 7 is designed, in view of recording density and so on, a characteristic of the BD light beam is given the highest priority, a characteristic of the DVD light beam is given the next priority, and a characteristic of the CD light beam is not given a priority, and as a result, a disadvantage is generated in the characteristic of the CD light beam.

Thereafter, the search operation is continued further and the objective lens 7 is moved closer to the optical disc 20, the system control part 3 detects the large signal change again.

At this time, the optical pickup 7 was found to have moved for around 1.2 mm after the focus of the CD light beam was focused on the front surface of the optical disc 20. In other words, it is considered that the CD light beam is focused on the recording layer of the optical disc 20 at this time.

That is, in the case of the CD discriminating processing, if the system control part 3 assumes that a moving distance d2 of the objective lens 7 from the small signal change to the large signal change as the thickness of the cover layer as similar to the BD discriminating processing, the system control part 3 erroneously recognizes that a distance from the position xc on the front surface of the optical disc 20 to a position xf which is a position where the fake phenomenon is detected as the thickness of the cover layer as shown in FIG. 3.

At this time, the system control part 3 recognizes around a half of the distance from the front surface to the recording layer of the optical disc 20 as the thickness of the cover layer. For this reason, there is possibility that the system control part 3 erroneously discriminates the optical disc 20 as the DVD medium 20d, not as the CD medium 20c.

As described above, it was found out that, in the optical disc driving apparatus 1, when the system control part 3 carries out the search operation with respect to the CD medium 20c by using the CD light beam, the large signal change is detected twice, and the CD light beam is focused on the recording layer of the optical disc 20 at the time when the large signal change of a second time, not a first time, is detected, and the focus of the CD light beam is positioned in the vicinity of a middle point between the front surface and the recording layer of the optical disc 20 at the time when the large signal change of the first time is detected.

In view of the above, the system control part 3 of the optical disc driving apparatus 1 assumes that the focus of the CD light beam is at a reference point at the time of detecting the large signal change of the first time, sets the reference point as a starting point in measuring a moving distance d of the objective lens 7, and recognizes that the CD light beam is focused on the recording layer of the optical disc 20 at the time of detecting the large signal change of the second time.

Figure 4:
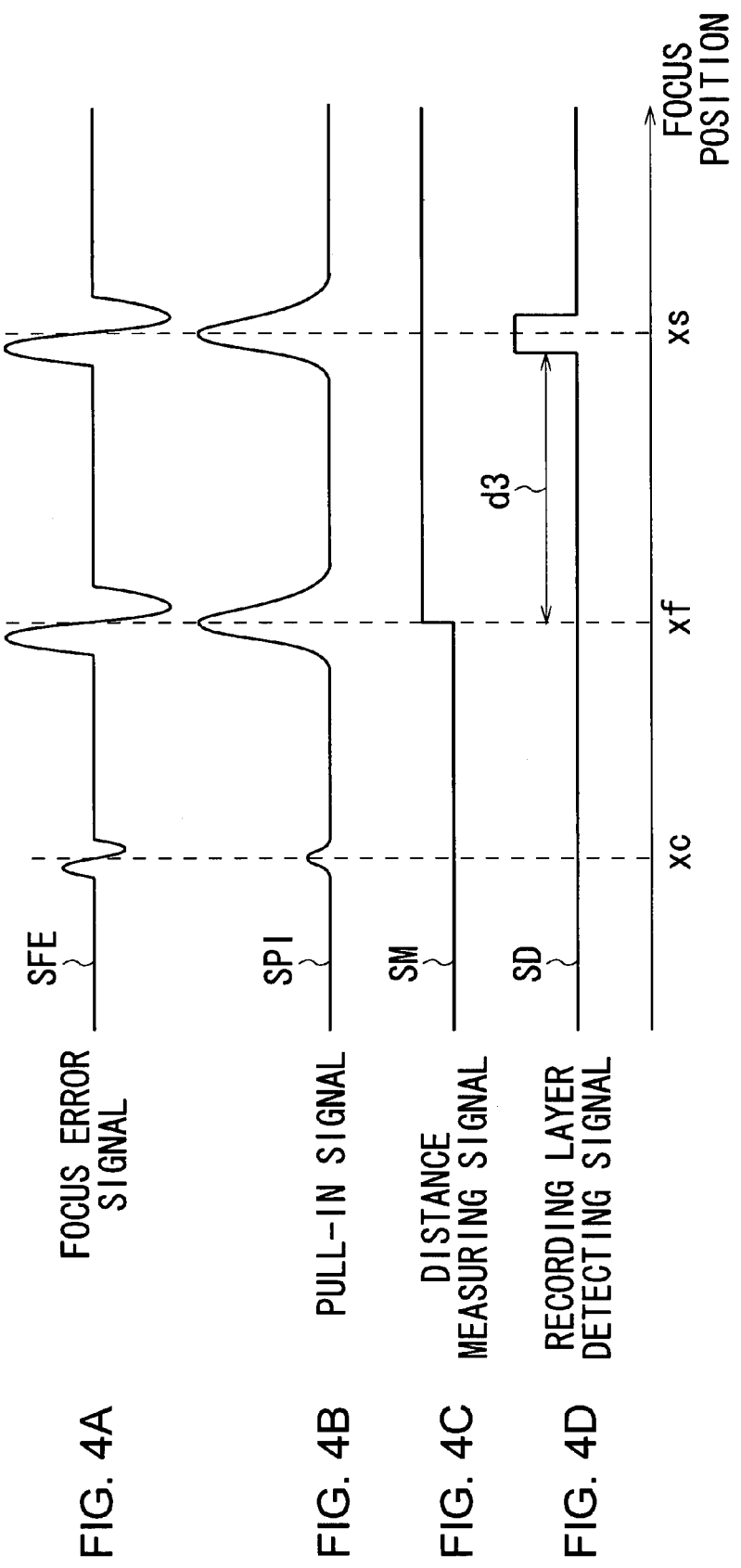
FIG. 4 is a schematic diagram used for explaining distance measurement in CD discriminating processing (2)

That is, as shown in FIG. 4 corresponding to FIG. 2, although the system control part 3 recognizes that the CD light beam is focused on the front surface of the optical disc 20 at the time of detecting the small signal change, the distance measuring signal SM is not increased and the low level is maintained.

Thereafter, when the large signal change of the first time, that is, the fake phenomenon, is detected, the system control part 3 increases the distance measuring signal SM from the low level to the high level, and starts the measuring of time by the counter (not shown).

Further, the system control part 3 recognizes that the CD light beam is focused on the recording layer of the optical disc 20 when the large signal change of the second time is detected, and temporarily increases the recording layer detection signal SD showing that the recording layer is detected from the low level to the high level.

At this time, the system control part 3 terminates the measuring of time by the counter at the time when the recording layer detection signal SD is increased to the high level, and multiplies the elapsed time TP at this time by the moving speed V of the objective lens 7, and thereby calculating a moving distance d3 while the measuring by the counter, that is, a distance from the position xf to a position xs.

Next, the system control part 3 compares the moving distance d3 with a fake distance df which is a theoretical distance from the position xf where the fake phenomenon is detected to the position xs on the recording layer. For example, when the fake distance df is 0.6 mm, and the moving distance d3 is within a range of 0.6±0.12 mm (that is, the permissible range), taking into consideration an individual difference of the optical disc 20, a measurement error, and so on, the system control part 3 determines that the optical disc 20 is the CD medium 20c.

On the other hand, if the moving distance d3 here is not within the permissible range of the CD medium 20c, the system control part 3 determines that the optical disc 20 is not the CD medium 20c, but is the BD medium 20b or the DVD medium 20d, and a disc type has not been discriminated correctly in the preceding BD discriminating processing and the DVD discriminating processing, and carries out predetermined error processing.

As described above, in the CD discriminating processing, the system control part 3 uses detection of the large signal change of the first time (that is, detection of the fake phenomenon) when the focus of the CD light beam is on the position xf which is different from the recording layer, and detection of the large signal change of the second time when the focus of the CD light beam is on the position xs of the recording layer, and compares the moving distance d3 of the objective lens 7 from the large signal change of the first time to the large signal change of the second time with the fake distance df in order to determine whether the optical disc 20 is the CD medium 20c or not.

(2-3) Disc Type Discriminating Processing

Figure 5:
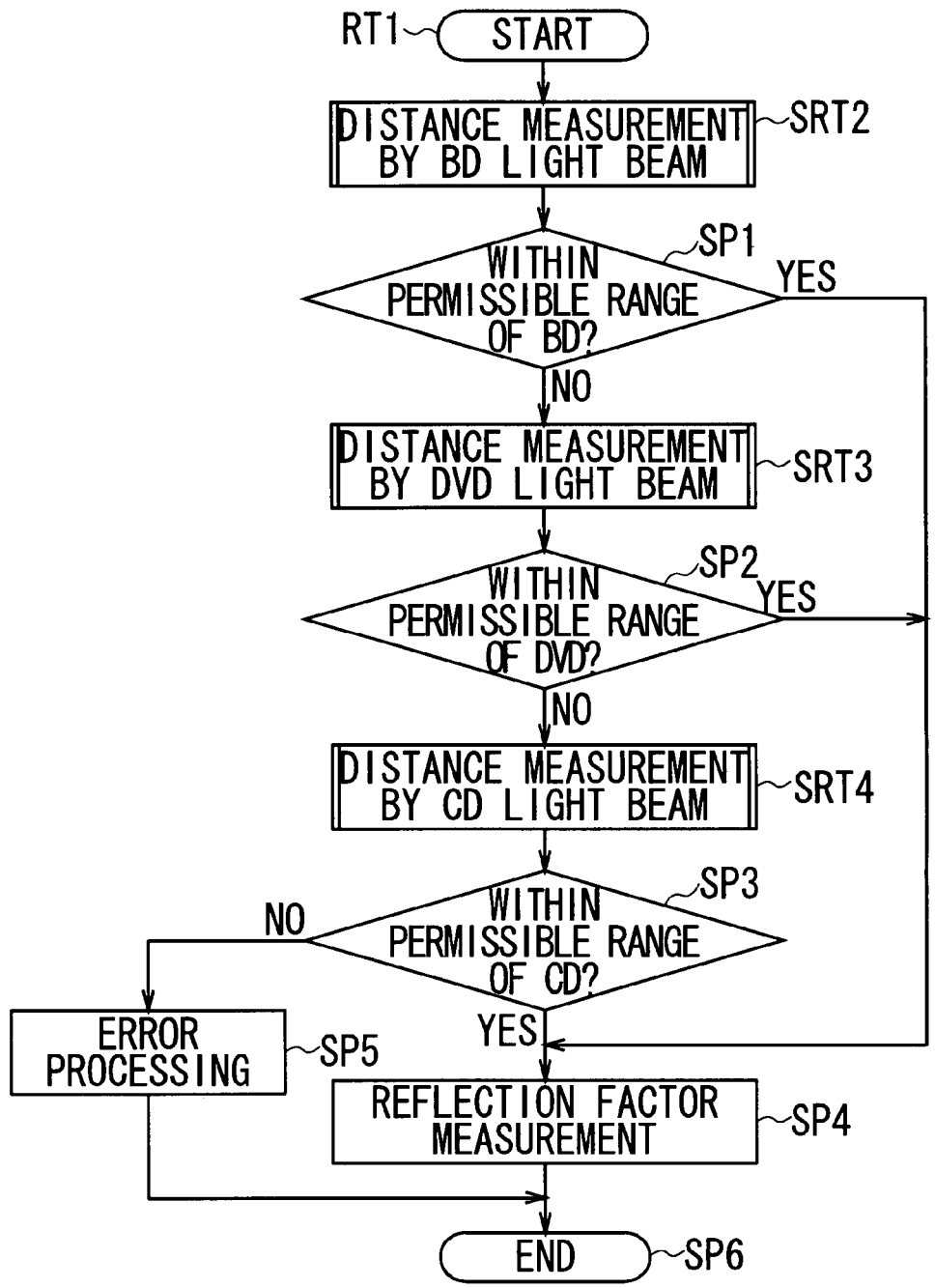
FIG. 5 is a flowchart showing a disc type discriminating processing procedure.
Figure 6:
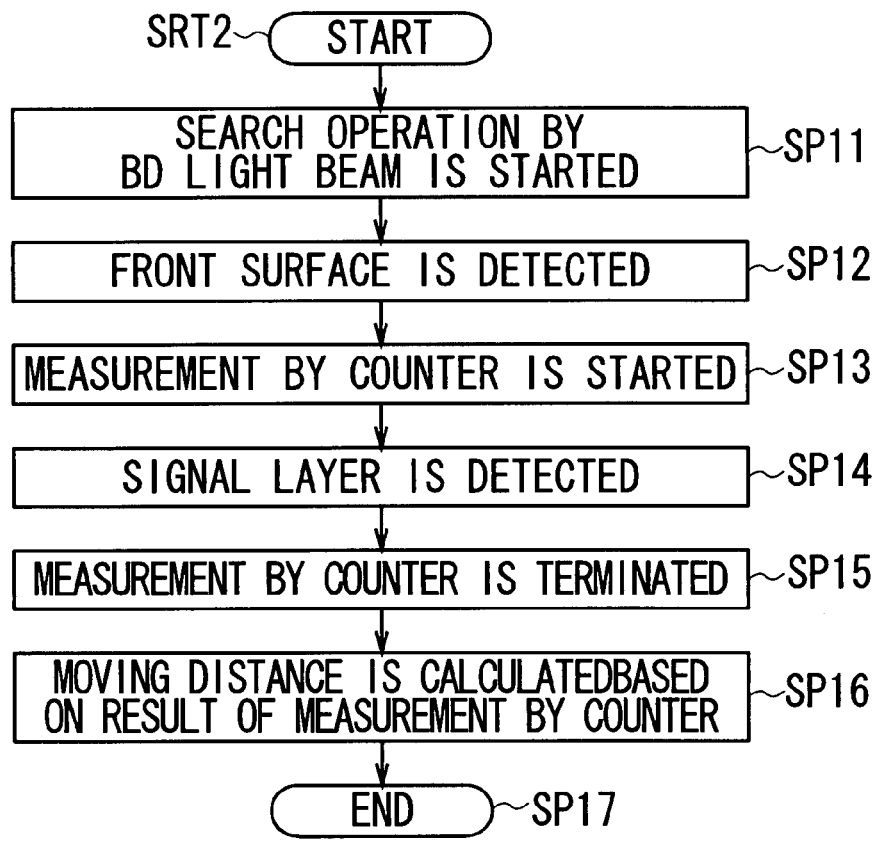
FIG. 6 is a flowchart showing a distance measurement processing procedure by BD light beam.
Figure 7:
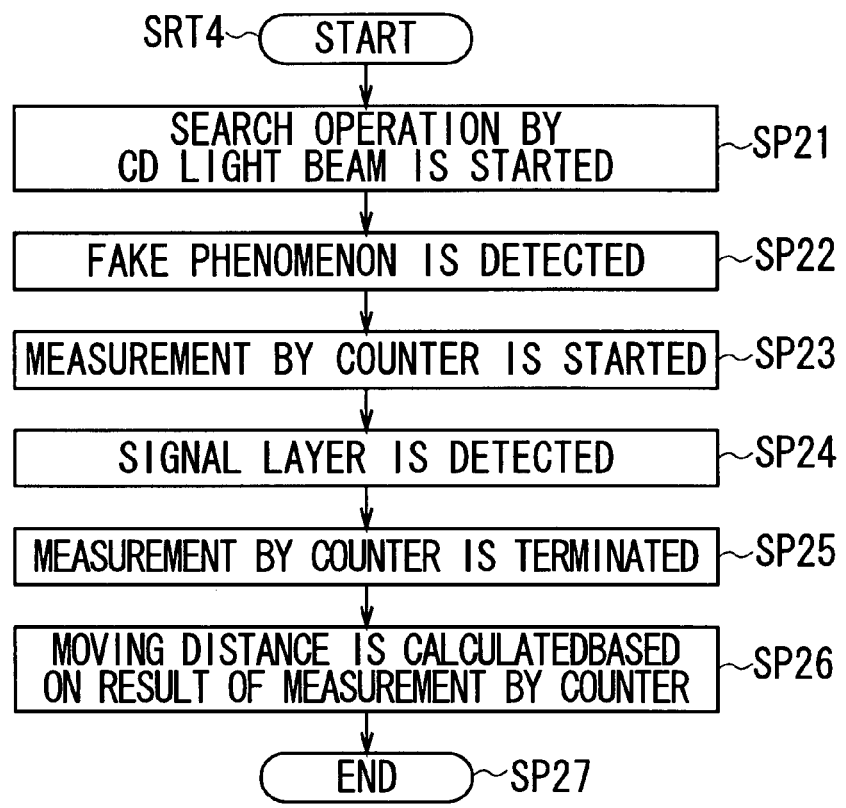
FIG. 7 is a flowchart showing a distance measurement processing procedure by CD light beam.

Next, the disc type discriminating processing in the optical disc driving apparatus 1 will be described with reference to flowcharts shown in FIGS. 5, 6, and 7.

When a detecting unit (not shown) detects that the optical disc 20 is newly mounted, the system control part 3 of the optical disc driving apparatus 1 starts a disc type discriminating processing procedure RT1 (FIG. 5) and moves to a distance measuring processing procedure SRT2 (FIG. 6) by the BD light beam, and enters from a start step to move to step SP11. In step SP11, the system control part 3 starts the search operation by the BD light beam, and moves to the next step SP12.

In step SP12, the system control part 3 detects that the BD light beam is focused on the front surface of the optical disc 20 by detecting the small signal change in the focus error signal SFE and the pull-in signal SPI, and moves to the next step SP13. In step SP13, the system control part 3 starts the measuring by the counter, and moves to the next step SP14.

In step SP14, the system control part 3 detects that the BD light beam is focused on the recording layer of the optical disc 20 by detecting the large signal change in the focus error signal SFE and the pull-in signal SPI, and moves to the next step SP15. In step SP15, the system control part 3 ends the measuring by the counter, and moves to the next step SP16.

In step SP16, the system control part 3 calculates the moving distance d1 during the measuring by the counter by multiplying the elapsed time TP by the moving speed V of the objective lens 7, moves to the next step SP17 and ends the distance measuring processing procedure SRT2 by the BD light beam, returns to the original disc type discriminating processing procedure RT1 (FIG. 5), and then moves to step SP1.

In step SP1, the system control part 3 determines whether the moving distance d1 is within the permissible range of the BD medium 20b. Here, if a positive result is obtained, this shows that the optical disc 20 can be assumed to be the BD medium 20b. At this time, the system control part 3 discriminates the optical disc 20 as the BD medium 20b, and moves to the next step SP4.

On the other hand, if a negative result is obtained in step SP1, this at least shows that the optical disc 20 is not discriminated as the BD medium 20b. At this time, the system control part 3 moves to a next distance measuring processing procedure SRT3 by the DVD light beam.

In the distance measuring processing procedure SRT3 by the DVD light beam, the system control part 3 calculates the moving distance d1 by carrying out processing similar to the distance measuring processing procedure SRT2 (FIG. 6) by the BD light beam by using the DVD light beam, and moves to the next step SP2.

In step SP2, the system control part 3 determines whether the moving distance d1 is within the permissible range of the DVD medium 20d. Here, if a positive result is obtained, this shows that the optical disc 20 can be assumed to be the DVD medium 20d. At this time, the system control part 3 discriminates the optical disc 20 as the DVD medium 20d, and moves to the next step SP4.

On the other hand, if a negative result is obtained in step SP2, this shows that the optical disc 20 is not discriminated as any of the BD medium 20b and the DVD medium 20d. At this time, the system control part 3 moves to a distance measuring processing procedure STR4 (FIG. 7) by the CD light beam, enters from a start step, and moves to step SP21. In step SP21, the system control part 3 starts the search operation by the CD light beam, and moves to the next step SP22.

In step SP22, the system control part 3 recognizes that the fake phenomenon is detected when the large signal change of the first time in the focus error signal SFE and the pull-in signal SPI is detected, and moves to the next step SP23. In step SP23, the system control part 3 starts the measuring by the counter and moves to the next step SP24.

In step SP24, the system control part 3 detects that the CD light beam is focused on the recording layer of the optical disc 20 by detecting the large signal change of the second time in the focus error signal SFE and the pull-in signal SPI, and moves to the next step SP25. In step SP25, the system control part 3 ends the measuring by the counter, and moves to the next step SP26.

In step SP26, the system control part 3 calculates the moving distance d3 during the measuring by the counter by multiplying the elapsed time TP by the moving speed V of the objective lens 7, moves to the next step SP27, ends the distance measuring processing procedure SRT4 by the CD light beam, returns to the original disc type discriminating processing procedure RT1 (FIG. 5), and then moves to step SP3.

In step SP1, the system control part 3 determines whether the moving distance d3 is within the permissible range of the CD medium 20c. Here, if a positive result is obtained, this shows that the optical disc 20 can be assumed to be the CD medium 20c. At this time, the system control part 3 discriminates the optical disc 20 as the CD medium 20c, and moves to the next step SP4.

In step SP4, the system control part 3 irradiates, with respect to the optical disc 20 which could be discriminated as any one of the BD medium 20b, the DVD medium 20d, and the CD medium 20c, an light beam corresponding to each type and measures a reflection factor. In this manner, the system control part 3 determines whether the optical disc 20 is a so-called ROM type, a Recordable (R) type, or a Rewritable (RE) type/Rewritable (RW) type, that is a detailed type, moves to the next step SP6, and ends the disc type discriminating processing procedure RT1.

On the other hand, if a negative result is obtained in step SP3, this shows that it is not possible to discriminate the optical disc 20 as any of the BD medium 20b, the DVD medium 20d, or the CD medium 20c from the moving distance of the objective lens 7. At this time, the system control part 3 moves to the next step SP5.

In step SP5, the system control part 3 carries out predetermined error processing such as ejecting the optical disc 20, moves to the next step SP6, and ends the disc type discriminating processing procedure RT1.

(3) Starting Focus Control

In a case where the focus control described above is carried out, the optical disc driving apparatus 1 can carry out the feedback control appropriately under conditions where the focus error signal SFE shown in FIG. 2A is almost linear and a change amount of the focus error signal SFE and a shift amount from a focusing position are almost in a proportional relationship.

For this reason, the optical disc driving apparatus 1 carries out the focus control within a range of a straight line between a maximum value and a minimum value in a S-shaped curve obtained at the time of the large signal change of the focus error signal SFE (FIG. 2A).

That is, the optical disc driving apparatus 1 needs to start the actual focus control after moving a focus of an light beam to the vicinity of the recording layer of the optical disc 20 after a type of the optical disc 20 is discriminated and the thickness and so on of the cover layer is recognized.

(3-1) Cases of BD Medium and DVD Medium

Figure 8:
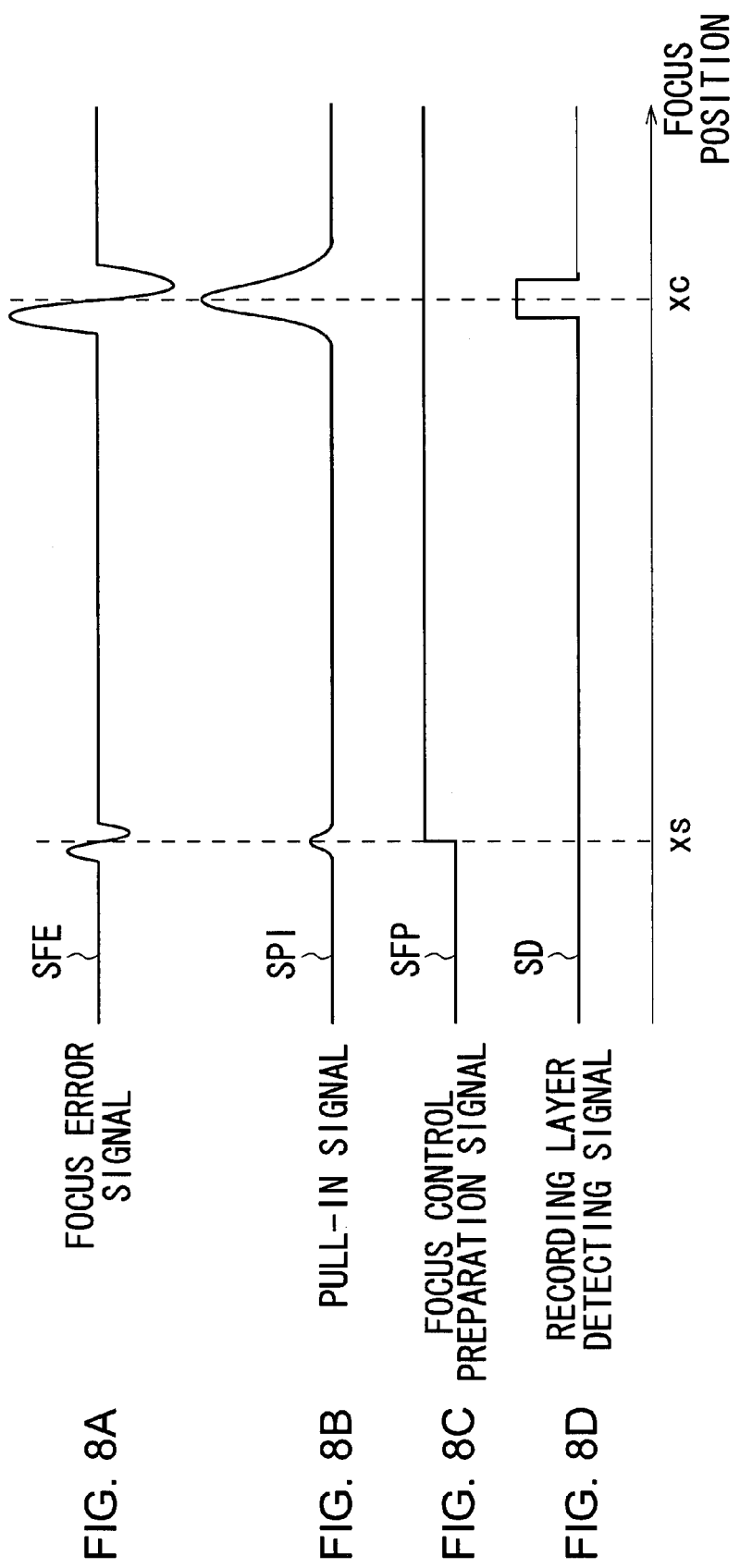
FIG. 8 is a schematic diagram used for explaining start of focus control in a BD and a DVD.

In a case where the optical disc 20 is the BD medium 20b or the DVD medium 20d, as shown in FIG. 8 corresponding to FIG. 2, an light beam is focused on the recording layer of the optical disc 20 when the large signal change in the focus error signal SFE and the pull-in signal SPI is detected.

Therefore, the system control part 3 of the optical disc driving apparatus 1 carries out the search operation by the BD light beam as similar to the case of the disc type discriminating processing, in a case where, for example, the optical disc 20 is the BD medium 20b.

Here, the system control part 3 assumes that the focus of the light beam is at the reference point at the time when the small signal change is detected in the focus error signal SFE and the pull-in signal SPI, increases a focus control preparation signal SFP from the low level to the high level, and is set in a focus control preparation state.

The focus control preparation state is a state in which the system control part 3 starts the focus control from when the large signal change is detected next, in other words, a state in which the system control part 3 awaits detection of the large signal change.

Thereafter, the system control part 3 recognizes that the BD light beam is focused on the recording layer of the optical disc 20 at the time when the large signal change is detected, and temporarily increases a recording layer detection signal SD showing that the recording layer is detected from the low level to the high level.

At this time, the system control part 3 starts the focus control at the time when the recording layer detection signal is increased to the high level.

In this case, the system control part 3 is set in the focus control preparation state at the time when the small signal change is detected, since it is found in advance that, if the optical disc 20 is the BD medium 20b, the large signal change is detected only once in the search operation.

As described above, in a case where the optical disc 20 is the BD medium 20b, the system control part 3 is in the focus control preparation state from when the small signal change is detected and the BD light beam is focused on the front surface of the optical disc 20. Thereafter, the system control part 3 starts the focus control by determining that the BD light beam is in the vicinity of the recording layer of the optical disc 20 at the time when the large signal change is detected.

The system control part 3 starts the focus control as similar to the case where the optical disc 20 is the BD medium 20b even in a case where the optical disc 20 is the DVD medium 20d.

(3-2) Case of CD Medium

Figure 9:
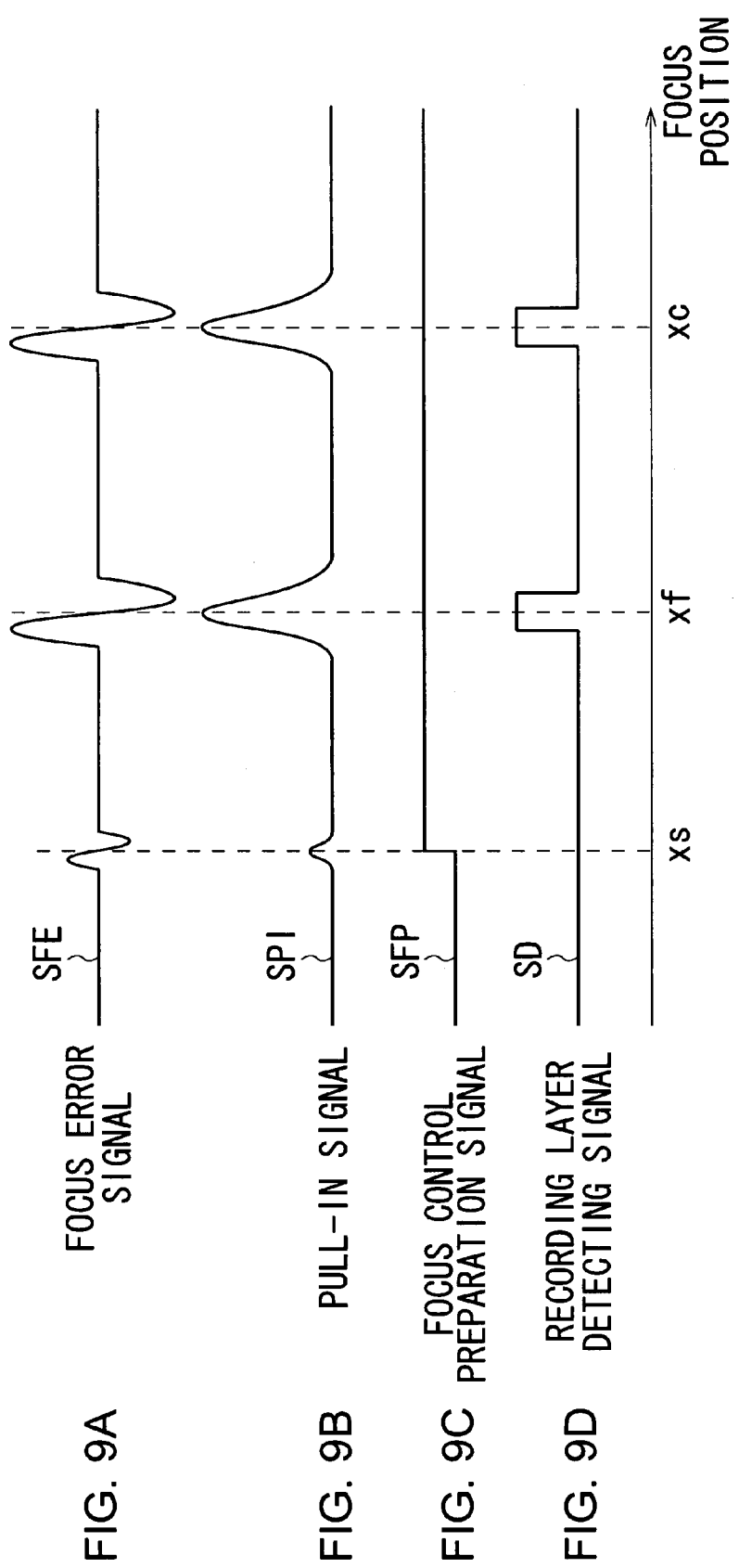
FIG. 9 is a schematic diagram used for explaining start of focus control in the CD (1)

On the other hand, in a case where the optical disc 20 is the CD medium 20c, the system control part 3 detects the large signal change, that is, the fake phenomenon, at the time when the focus of the CD light beam reaches the position xf during the search operation by the CD light beam, as shown in FIG. 9 corresponding to FIG. 3.

For the above reason, if the system control part 3 is assumed to be set in the focus control preparation state at the time when the small signal change is detected, as similar to the case where the optical disc 20 is the BD medium 20b or the DVD medium 20d, the focus control is started at the time when the fake phenomenon is detected as the large signal change of the first time.

In this case, the system control part 3 starts the focus control in a state where the focus of the CD light beam is at the position xf which is almost in the middle between the front surface and the recording layer of the optical disc 20. Therefore, it is not possible for the system control part 3 to focus the CD light beam on the recording layer correctly.

Figure 10:
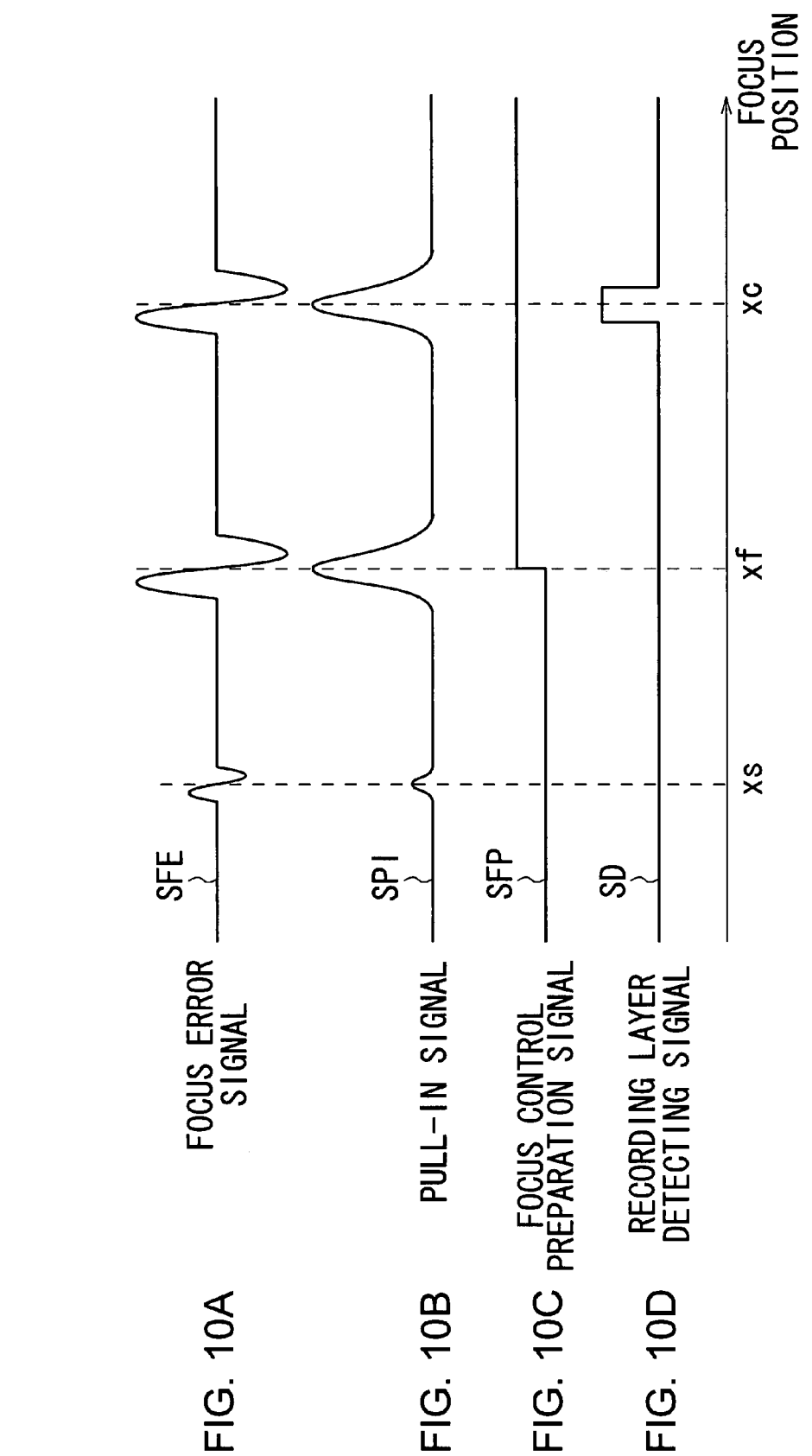
FIG. 10 is a schematic diagram used for explaining start of focus control in the CD (2)

In view of the above, as shown in FIG. 10 corresponding to FIG. 4, the system control part 3 assumes that the focus of the CD light beam is at the reference point when the large signal change of the first time (that is, the fake phenomenon) is detected and is set in the focus control preparation state, and then starts the focus control at the time when the large signal change of the second time is detected.

That is, although the system control part 3 recognizes that the CD light beam is focused on the front surface of the optical disc 20 when the small signal change is detected, the system control part 3 does not increase the focus control preparation signal SFP and keeps the signal SFP at a low level.

Thereafter, the system control part 3 increases the focus control preparation signal SFP from a low level to a high level at the time when the large signal change of the first time, that is, the fake phenomenon, is detected, and is in the focus control preparation state.

Further, the system control part 3 recognizes that the CD light beam is in the vicinity of the recording layer of the optical disc 20 when the large signal change of the second time is detected, increases the recording layer detection signal SD showing that the recording layer is detected is temporarily increased from a low level to a high level, and then starts the focus control.

In this case, since it is found out in advance that the large signal change is detected twice in the search operation if the optical disc 20 is the CD medium 20c, the system control part 3 does not carry out any operation in particular at the time when the small signal change is detected, and is set in the focus control preparation state at the time when the large signal change of the first time (that is, the fake phenomenon) is detected.

As described above, in a case where the optical disc 20 is the CD medium 20c, the system control part 3 is set in the focus control preparation state from when the large signal change of the first time, that is, the fake phenomenon, is detected, and thereafter determines that the CD light beam is in the vicinity of the recording layer of the optical disc at the time when the large signal change of the second time is detected, and starts the focus control.

(3-3) Focus Control Starting Processing

Next, the focus control starting processing at the time when the system control part 3 of the optical disc driving apparatus 1 starts the focus control will be described by using flowcharts shown in FIGS. 11 and 12.

Figure 11:
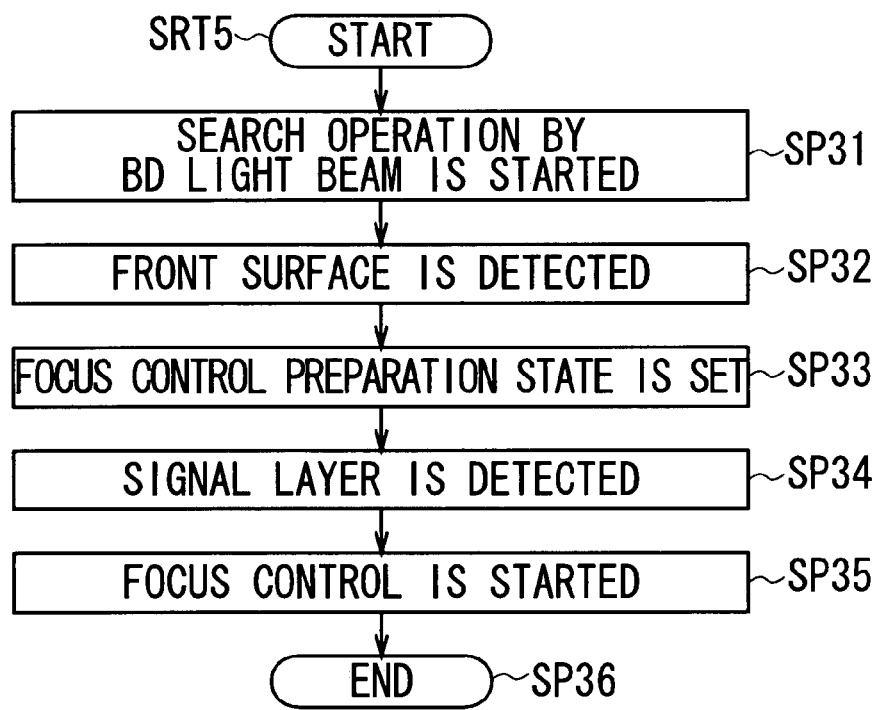
FIG. 11 is a flowchart showing a focus control starting processing procedure in a case of the BD.

In a case where the optical disc 20 is determined to be the BD medium 20b by the disc type discriminating processing (FIG. 5) described above, the system control part 3 starts a focus control starting processing procedure RT5 in a case of the BD shown in FIG. 11, and moves to step SP31. In step SP31, the system control part 3 starts the search operation by the BD light beam as similar to the case of step SP11 (FIG. 6), and moves to the next step SP32.

In step SP32, the system control part 3 detects that BD light beam is focused on the front surface of the optical disc 20 by detecting the small signal change in the focus error signal SFE and the pull-in signal SPI, and moves to the next step SP33. In step SP33, the system control part 33, increases the focus control preparation signal SFP and is set in the focus control preparation state, and then moves to the next step SP34.

In step SP34, the system control part 3 detects that the BD light beam is focused on the recording layer of the optical disc 20 by detecting the large signal change in the focus error signal SFE and the pull-in signal SPI, and moves to the next step SP35.

In step SP35, the system control part 35 increases the recording layer detection signal SD and also starts the focus control, and moves to the next step SP36 to end the focus control starting processing procedure RT5 in the case of the BD.

The system control part 3 starts the focus control by carrying out processing similar to the focus control starting processing procedure RT5 in the case of the BD by using the DVD light beam, also in a case where the optical disc 20 is discriminated as the DVD medium 20d.

Figure 12:
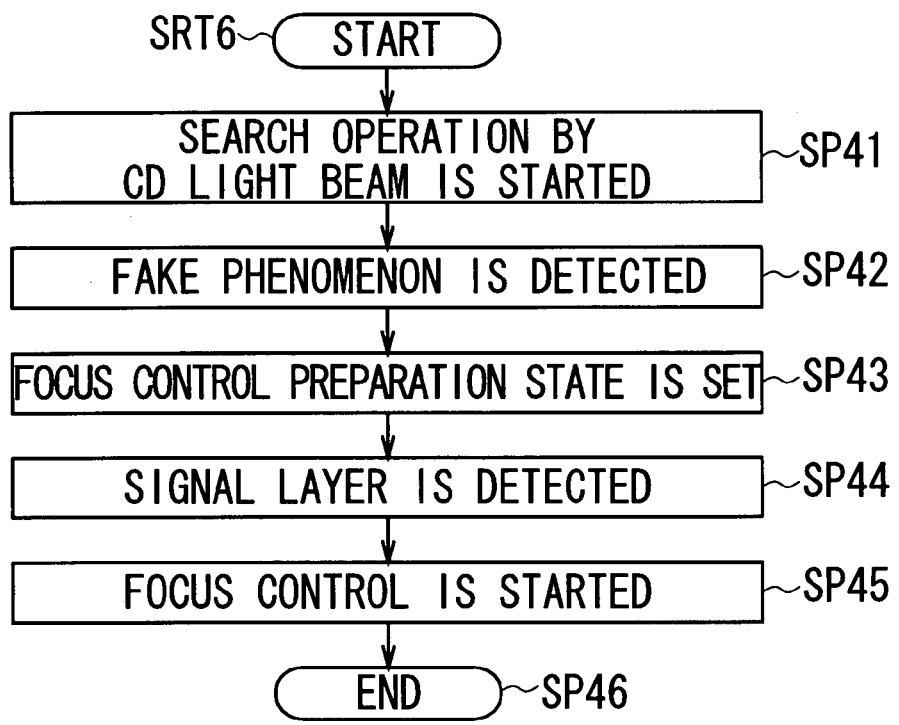
FIG. 12 is a flowchart showing a focus control starting processing procedure in a case of the CD.

On the other hand, the system control part 3 starts a focus control starting processing procedure RT6 in the case of the CD shown in FIG. 12 when the optical disc 20 is discriminated as the CD medium 20c by the disc type discriminating processing (FIG. 5) described above, and moves to step SP41. In step SP41, the system control part 3 starts the search operation by the CD light beam as similar to the case of step SP21 (FIG. 7), and moves to the next step SP42.

In step SP42, the system control part 3 detects the large signal change of the first time, that is, the fake phenomenon, in the focus error signal SFE and the pull-in signal SPI, and moves to the next step SP43. In step SP43, the system control part 3 increases the focus control preparation signal SFP and is set in the focus control preparation state, and moves to step SP44.

In step SP44, the system control part 3 detects that the CD light beam is focused on the recording layer of the optical disc 20 by detecting the large signal change of the second time in the focus error signal SFE and the pull-in signal SPI, and moves to the next step SP45.

In step SP45, the system control part 3 increases the recording layer detection signal SD also starts the focus control, then moves to the next step SP46 to end the focus control starting processing procedure RT6 in the case of the CD.

(4) Operation and Effect

In the configuration described above, when a type of the optical disc 20 is discriminated by the disc type discriminating processing, the system control part 3 of the optical disc driving apparatus 1 carries out the search operation by the BD light beam and the DVD light beam in the BD discriminating processing and the DVD discriminating processing. At this time, the system control part 3 measures a distance from a position of detecting the small signal change corresponding to the front surface of the optical disc 20 to a position of detecting the large signal change corresponding to the recording layer thereof as the moving distance d1, and determines whether the optical disc 20 is the BD medium 20b or the DVD medium 20d by comparing the moving distance d1 with the layer thickness TL of the BD medium 20b or the DVD medium 20d.

On the other hand, in the CD discriminating processing, the system control part 3 carries out the search operation by the CD light beam, detects a distance from the position xf where the large signal change of the first time is detected as the fake phenomenon to the position xs where the large signal change of the second time corresponding to the recording layer thereof as the moving distance d3, and determines whether the optical disc 20 is the CD medium 20c or not based on the moving distance d3.

Therefore, the system control part 3 uses the fake phenomenon that is found out to be generated in the certain position xf when the CD light beam is irradiated on the CD medium 20c, and compares a distance from the position xf where the fake phenomenon is generated to the position xs of the recording layer, that is, the moving distance d3, with the fake distance df. Thereby, the system control part 3 can correctly determine whether the optical disc 20 is the CD medium 20c or not with high precision.

At this time, in the CD discriminating processing, unlike in the BD discriminating processing and the DVD discriminating processing, the system control part 3 does not regard the large signal change of the first time by the fake phenomenon as the detection of a signal layer, but uses the large signal change of the first time as a trigger for starting measuring of the moving distance d3. Thereby, the system control part 3 prevents that the detection of the large signal change of the first time is recognized in error as the detection of the signal layer.

In addition, in the cases of the BD medium 20b and the DVD medium 20d, the system control part 3 does not detect the large signal change although there is a possibility that the fake phenomenon is not generated or the fake phenomenon by the small signal change is generated, and further, the system control part 3 basically does not detect a plurality of times of the large signal changes. Therefore, the possibility of erroneously determining whether the optical disc 20 is the CD medium 20c or not is restricted to be extremely low.

In the case of the DVD medium 20d, although there is a case where two layers of the recording layer are provided, an interlayer distance in this case is specified as around 0.04 to 0.06 mm, which is significantly different from the fake distance df (around 0.6 mm).

That is, in a case where the CD discrimination processing is carried out with respect to the DVD medium 20d in which the two layers of the recording layer are provided, although the system control part 3 detects the large signal change twice, the detection internal is significantly different from the fake distance df and is not within the permissible range (for example, 0.6±0.12 mm). Therefore, the DVD medium 20d is practically not discriminated in error as the CD medium 20c.

In a case where generation of the fake phenomenon is discriminated in advance, the system control part 3 carries out so-called mask processing in which, for example, a signal change of a predetermined period is excluded after the front surface is detected by the small signal change. Thereby, it is considered a method of not detecting the large signal change by the fake phenomenon.

However, in the method of carrying out the mask processing, the front surface of the optical disc 20 is used as a reference. Therefore, a period of carrying out the mask processing, and so on is shifted due to variation in an optical characteristic of the optical pickup 5 and so on, an environmental change such as a temperature change, or variation in reflection factor and so on among manufactures and products of the optical disc 20. For this reason, there is a possibility that the large signal change by the fake phenomenon is detected and recognized in error as the recording layer. In addition, at the time of shipment from a factory, an adjusting operation needs to be carried out corresponding to an individual characteristic of the optical pickup 5 with respect to the period of carrying out the mask processing.

On the other hand, the system control part 3 detects the large signal change by the fake phenomenon, and then recognizes a position where the next large signal change is detected as the position of the recording layer. In this manner, there is not much influence from the variety of variations and so on described above, and the adjusting operation and so on of the individual optical pickup 5 is not necessary.

In addition, in the case of the BD medium 20b or the DVD medium 20d, when the focus control is started, the system control part 3 of the optical disc driving apparatus 1 is set in the focus control preparation state from when the small signal change is detected and the BD light beam or the DVD light beam is focused on the front surface of the optical disc 20, and thereafter determines that the BD light beam or the DVD light beam is in the vicinity of the recording layer of the optical disc 20 at the time when the large signal change is detected and starts the focus control.

On the other hand, in the case of the CD medium 20c, the system control part 3 is set in the focus control preparation state from when the large signal change of the first time, that is, the fake phenomenon, is detected. Thereafter, the system control part 3 determines that the CD light beam is in the vicinity of the recording layer of the optical disc 20 at the time when the large signal change of the second tome is detected, and starts the focus control.

Therefore, the system control part 3 uses the fake phenomenon which is found out to be generated in the certain position xf when the CD light beam is irradiated on the CD medium 20c, and is set in the focus control preparation state from when the fake phenomenon is generated. In this manner, the system control part 3 can start the focus control at the time when the large signal change is detected in the vicinity of the recording layer in the next time, and reliably bring the CD light beam into focus on the recording layer.

At this time, in the starting processing of the focus control in the CD, unlike in the starting processing of the focus control in the BD or the DVD, the system control part 3 does not regard the large signal change of the first time by the fake phenomenon as the detection of the signal layer, and uses the large signal change of the first time as a trigger to move to the focus control preparation state. Thereby, the system control part 3 can prevent the detection of the large signal detection of the first time from being recognized in error as the detection of the signal layer.

According to the above configuration, the system control part 3 of the optical disc driving apparatus 1 carries out the search operation by the CD light beam in the CD discrimination processing when a type of the optical disc 20 is discriminated by the disc type discrimination processing, detects a distance from the position xf where the large signal change of the first time is detected as the fake phenomenon to the position xs where the large signal change of the second time corresponding to the recording layer is detected as the moving distance d3. The system control part 3 determines whether the optical disc 20 is the CD medium 20c or not based on the moving distance d3, and thereby the system control part 3 can correctly determine whether the optical disc 20 is the CD medium 20c or not with high precision.

In addition, when the focus control is started, in the case of the CD medium 20c, the system control part 3 is set in the focus control preparation state from when the fake phenomenon is detected as the large signal change of the first time. Thereafter, the system control part 3 determines that the CD light beam is in the vicinity of the recording layer of the optical disc 20 at the time when the large signal change of the second time is detected and starts the focus control, and thereby the system control part 3 can reliably bring the CD light beam into focus on the recording layer.

(5) Other Embodiments

In the embodiment described above, the description was made with respect to the case where generation of the fake phenomenon in the CD medium 20c is used, and the distance measurement is started and the focus control preparation state is set at the time the fake phenomenon is generated. However, the present invention is not limited thereto, and may be applied to the optical disc 20 of other types in which the fake phenomenon is generated, in a manner such that, in a case where it is found out that the fake phenomenon is generated in the DVD medium 20*d*, the distance measurement is stated and the focus control preparation state is set at the time the fake phenomenon is generated.

In addition, in the embodiment described above, the description was made with respect to the case where, when the fake phenomenon is generated only once in the search operation, the distance measurement is started at the time the large signal change of the first time is detected and the distance measurement is terminated at the time when the large signal change of the second time is detected, and the focus control preparation state is set at the time the large signal change of the first time is detected and the focus control is started at the time when the large signal change of the second time is detected. However, the present invention is not limited thereto, and in a case where the fake phenomenon is generated a plurality of times during the search operation and it is found out in advance that the large signal change by the recording layer is detected at which time, the specific fake phenomenon generated before the large signal change by the recording layer may be configured to be a starting trigger of the distance measurement or the focus control preparation state, and the large signal change of a predetermined order may be as a terminating trigger of the distance measurement or where the focus control is started.

For example, in a case where it is found out in advance that the fake phenomenon is generated for three times in the CD medium 20*c*, and the large signal change by the recording layer is detected between the fake phenomenon of the second time and the fake phenomenon of the third time, that is, the light beam is focused on the recording layer at the time when the large signal change of the third time, the system control part 3 starts the distance measurement at the time the fake phenomenon of the first time is generated and terminates the distance measurement at the time the large signal change of the third time is detected, and is set in the focus control preparation state at the time when the large signal change of the first time is detected and starts the focus control at the time the large signal change of the third time is detected.

Further, in the embodiment described above, the description was made with respect to the case where the disc type discriminating processing and the focus control starting processing are carried out by combining the large signal change by the fake phenomenon and the large signal change by the signal layer. However, the present invention is not limited thereto, and in a case where it is found out that the fake phenomenon is generated in, for example, the DVD medium 20*d*, by combining the large signal change by the fake phenomenon and the large signal change by the signal layer, the number of the recording layers of the DVD mediums 20*d* may be discriminated, and so on.

Further, in the embodiment described above, the description was made with respect to the case where the objective lens 7 is compatible with three wavelengths, which are the wavelength of the CD as 780 nm, the wavelength of the DVD as 660 nm, and the wavelength of the BD as 405 nm. However, the present invention is not limited thereto, and the objective lens 7 may be compatible with two wavelengths or 4 or more of wavelengths. What is required here is that it is found out in advance that the fake phenomenon is generated when the objective lens 7 brings the light beam of a specific wavelength into focus to a specific position on the optical disc 20 of a specific type.

Further, in the embodiment described above, the description was made with respect to the case where generation of the fake phenomenon is detected based on the large signal change in the focus error signal SFE and the pull-in signal SPI. However, the present invention is not limited thereto, and the fake phenomenon may be made detected based only on the signal change in the focus error signal SFE, or generation of the fake phenomenon may be made detected based on a result of generating a receiving signal in the photodetector 9 such as the reproducing RF signal SRF and so on, a signal change of a variety of signals calculated based on the receiving signal, or a combination of these.

Further, in the embodiment described above, the description was made with respect to the case where the laser diode 6 is configured with the CD laser diode 6*c*, the DVD laser diode 6*d*, and the BD laser diode 6*b* that emit laser light of a single wavelength. However, the present invention is not limited thereto, and as the laser diode 6, for example, a laser diode compatible with two wavelengths that can emit light beam of two types of wavelengths for the CD and the DVD and the BD laser diode 6*b* may be combined, or a laser diode compatible with three wavelengths that can emit light beam of three types of wavelengths for the CD, the DVD, and the BD may be used.

Further, in the embodiment described above, the description was made with respect to the case where the optical disc driving apparatus 1 records information on the optical disc 20 and reproduces the information from the optical disc 20, that is, the optical disc driving apparatus 1 carries out both recording and reproducing. However, the present invention is not limited thereto, and may be applied to a case where, for example, the optical disc driving apparatus 1 is an optical disc reproducing apparatus that carries out only reproduction of information, or an optical disc recording apparatus that carries out only recording of information. Moreover, the present invention may be applied in a case where the optical disc driving apparatus 1 carries out both recording and reproducing for the CD medium 20*c* and the DVD medium 20*d*, and carries out only reproduction for the BD medium 20*b*.

Further, in the embodiment described above, the description was made with respect to the case where the optical disc driving apparatus 1 as the optical recording medium driving apparatus is configured with the objective lens 7 as the objective lens, the photodetector 9 and the signal generation unit 10 as the detecting unit, and the control unit 2 as the control unit. However, the present invention is not limited thereto, and the optical recording medium driving apparatus may be configured with the objective lens, the detecting unit, and the control unit including a variety of other circuit configurations.

The present invention can be applied to the optical disc driving apparatus compatible with a plurality of types of optical discs.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium driving apparatus, comprising:
   an objective lens that focuses a light beam on an optical recording medium provided with a recording layer for information recording, and is moved along an optical axis of the light beam by a driving unit;
   a detection unit that detects a reflected light beam obtained by a reflection of the light beam from the optical recording medium and generates a detection signal; and
   a control unit that, when the driving unit is controlled to make the objective lens moved close to the optical recording medium from a distant position, sets a position of a focus of the objective lens when the detection signal at a level similar to a focus level obtained when the light beam is focused on the recording layer is obtained as a reference point, and also recognizes that the light beam is focused on the recording layer when the detection signal of the focus level is obtained for a number of times designated in advance.

2. The optical recording medium driving apparatus according to claim 1, wherein
the control unit determines the optical recording medium from a plurality of types of the optical recording media each having a different space between a front surface to the recording layer of the optical recording medium, based on a distance between a first position of the objective lens at the reference point and a second position of the objective lens when the light beam is recognized to be focused on the recording layer.

3. The optical recording medium driving apparatus according to claim 2, wherein
the control unit switches the reference point set at the position of the focus of the objective lens when the detection signal at the level similar to the focus level obtained when the light beam is focused on the recording layer is obtained, and the reference point set at the position of the focus of the objective lens when the light beam is focused on the front surface of the optical recording medium.

4. The optical recording medium driving apparatus according to claim 1, wherein the control unit uses as the detection signal a focus error signal in which a signal level changes according to a shift amount between a focus of the light beam and the recording layer.

5. The optical recording medium driving apparatus according to claim 4, wherein
the control unit starts focus control that feedback-controls the driving unit based on the focus error signal and keeps the focus of the light beam focused on the recording layer, from when the light beam is recognized to be focused on the recording layer.

6. The optical recording medium driving apparatus according to claim 1, wherein
the control unit uses a pull-in signal in which a signal level changes according to a light amount of the reflected light beam detected by the detection unit as the detection signal.

7. The optical recording medium driving apparatus according to claim 1, wherein
the control unit uses a combination of a focus error signal in which a first signal level changes according to a shift amount between a focus of the light beam and the recording layer, and a pull-in signal in which a second signal level changes according to a light amount of the reflected light beam detected by the detection unit.

8. The optical recording medium driving apparatus according to claim 1, wherein
the objective lens is a multifocal objective lens that focuses the light beam on two or more focuses.

9. An optical recording medium driving method, comprising:
a step of moving an objective lens that focuses a light beam on an optical recording medium provided with a recording layer for information recording close to the optical recording medium along an optical axis of the light beam from a distant position;
a step of detecting a reflected light beam obtained by a reflection of the light beam from the optical recording medium and generating a detection signal;
a step of setting a position of a focus of the objective lens when the detection signal at a level similar to a focus level obtained when the light beam is focused on the recording layer is obtained as a reference point; and
a step of recognizing that the light beam is focused on the recording layer when the detection signal of the focus level is obtained for a number of times designated in advance.

* * * * *